United States Patent [19]

Cogat

[11] Patent Number: 5,478,443
[45] Date of Patent: Dec. 26, 1995

[54] APPARATUS FOR SEPARATING BIOCHEMICAL COMPOUNDS FROM BIOLOGICAL SUBSTANCES

[76] Inventor: Pierre O. Cogat, 27 rue des Bénards, 92260 Fontenay Aux Roses, France

[21] Appl. No.: 60,095

[22] Filed: May 10, 1993

[30] Foreign Application Priority Data

May 11, 1992 [FR] France ............................ 92 05669

[51] Int. Cl.$^6$ ..................................................... B01D 3/00
[52] U.S. Cl. ................. 202/153; 159/901; 159/DIG. 10; 159/DIG. 11; 159/DIG. 16; 202/161; 202/175; 202/204; 202/205; 202/265; 203/78; 203/79; 203/80; 203/DIG. 16
[58] Field of Search .................... 202/154, 168, 202/204, 170, 205, 265, 202, 161, 182, 173, 153, 236, 175; 203/78, 79, 80, DIG. 9, DIG. 16, 95–98; 159/901, 25.1, 3, DIG. 10, DIG. 11, DIG. 16, DIG. 40

[56] References Cited

U.S. PATENT DOCUMENTS

| 2,194,851 | 3/1940 | Guinot ................................. 202/204 |
| 2,558,933 | 7/1951 | Cross ................................... 202/204 |
| 2,715,607 | 8/1955 | Lee ....................................... 202/153 |
| 3,034,900 | 5/1962 | Maranca et al. ..................... 426/489 |
| 3,644,179 | 2/1972 | Knoer ................................... 202/153 |
| 3,666,633 | 5/1972 | Essex et al. .......................... 202/204 |
| 4,342,627 | 8/1982 | Cane et al. ....................... 203/DIG. 13 |

FOREIGN PATENT DOCUMENTS

| 47316 | of 1915 | France . |
| 2483454 | 8/1981 | France . |
| 2569537 | of 1986 | France . |
| 2638333 | of 1990 | France . |

Primary Examiner—Viriginia Manoharan
Attorney, Agent, or Firm—Harris Beach & Wilcox

[57] ABSTRACT

An apparatus for extracting, concentrating, and separating biochemical compounds from plant or animal biological substances. It has a heating vessel for the substance to be treated, and is connected at its lower part to an evaporation circuit. The evaporation circuit is connected to the upper part of the heating vessel and, by a valve, to the bottom of a distillation column. A condenser is connected to a vacuum source and, by a valve to the top of the distillation column. A decanter is connected by a valve to the condenser and then successively to a first tank for recovering essential oil, a second tank for recovering aromatic water, and to the vacuum source. A dual discharge circuit has its first circuit connected by two valves to a third tank for receiving light aromatic compounds and to a fourth tank for receiving regenerated solvents. The second circuit is connected by two valves to either the second tank for recovering the aromatic water, a fifth tank receiving solvent to be regenerated, or a reflux circuit connected by two valves to either the upper part of the heating vessel or the upper part of the distillation column.

7 Claims, 3 Drawing Sheets

1

APPARATUS FOR SEPARATING BIOCHEMICAL COMPOUNDS FROM BIOLOGICAL SUBSTANCES

FIELD OF THE INVENTION

The invention relates to an installation for extracting, concentrating and separating volatile and/or extractable biochemical compounds from plant or animal biological substances, especially plants, fruits or condiments.

The invention relates more particularly to a single installation which makes it possible both to separately extract volatile or distillable aromatic compounds, water-soluble or water-insoluble compounds, as well as savoury compounds and the like, which are soluble in a defined water-alcohol mixture.

In document FR-A-2,638,333, the Applicant described equipment which makes it possible to extract juices and flavorings from plant substrates. This installation essentially comprises:

- a heating vessel, designed to receive the substances to be treated, connected at the lower part to a steam supply and at the upper part to an evaporation circuit;
- an evaporation circuit connected to the upper part of the heating vessel, then by a valve to the bottom of a distillation column, which is in turn connected at the top to a condenser, which is connected to a vacuum source;
- a circuit for discharging the liquid recovered in the condenser, connected to a recovery tank, which is in turn connected by a valve either to the heating vessel or to a draw-off orifice; mixtures of solvents, essential oils, aromatic waters or other compounds can thus be recovered from the condenser.

In practice, the material to be treated (berries, fruits, plants, condiments and the like) are placed in perforated baskets or on a grid in the heating vessel, then a sharp vacuum is established in order to extract, in the condenser, the most volatile products. Aromatic waters are thus recovered in the tank. In this installation, the steam is used either to heat the material before placing it under vacuum, or to heat the bottom of the heating vessel. This technique is satisfactory for recovering juices, and permits the extraction of only volatile products, working well with the lightest of those. Heavy oils can only be obtained by continuing the steam distillation. On the other hand, the savoury products, that is to say those which impart taste, or the nondistillable heavy oils, are unfortunately not extracted.

In short, while this installation advantageously permits the extraction of the light products, that is to say those which are rapidly lost after harvesting, then of the distillable heavy products, on the other hand, it does not permit the extraction of the nondistillable heavy savoury products or products which impart color or which are sought after for other properties.

When it is desired to recover these nondistillable savoury, colored or other compounds which are increasingly sought after, other procedures need to be carried out using separate and specific equipment. The result is that in order to enhance as much as possible the value of these plant products, a series of batch procedures need to be carried out using separate equipment, which process is lengthy and expensive.

OBJECTS OF THE INVENTION

The invention overcomes these disadvantages. It relates to an installation of the type in question, which makes it possible to extract, concentrate and separate virtually all the biochemical compounds from plant or animal biological substances using a single piece of equipment. It makes it possible especially to recover all the distillable and nondistillable aromatic compounds and also all the other savoury or nonsavoury compounds, or even products which impart color, using the same apparatus, the procedure being carried out batchwise, but without changing the equipment as was done up until now.

The invention relates more particularly to an installation which makes it possible for the material to be completely exhausted, thereby limiting the investments and facilitating the operation.

SUMMARY OF THE INVENTION

This installation for extracting, concentrating and separating biochemical compounds from plant or animal biological substances, comprising:

- a heating vessel, designed to receive the substances to be treated, connected at the lower part to a steam supply and at the upper part to an evaporation circuit, and having, at the lower part, a stirrer,
- an evaporation circuit connected to the upper part of the heating vessel, then by a valve to the bottom of a distillation column, which is in turn connected at the top to a valve, then to a condenser which is connected to a vacuum source,
- a circuit for discharging the liquid recovered in the condenser, connected to a recovery tank, which is in turn connected by a valve either to the heating vessel or to a draw-off orifice where the liquid, recovered in the condenser, consists either of the solvent, or of aromatic waters charged with distillable light aromatic compounds, or of a mixture of water and distillable essential oils;

is characterized in that the discharging circuit comprises:

- a decanter connected by a valve to the condenser, then to a first tank for recovering the essential oils, and to a second tank for recovering the aromatic waters, the said decanter being also connected at the top to the vacuum source;
- a dual discharging circuit connected:
  - the first, by a set of valves, to a third tank designed to receive the light aromatic compounds, and to a fourth tank designed to receive the regenerated solvent,
  - the second, by a set of valves, either to the second tank for recovering the aromatic waters, or to a fifth tank designed to receive the solvent to be regenerated, or to a reflux circuit connected by valves, either to the upper part of the heating vessel, or to the upper part of the distillation column.

The installation conforming to the invention makes it possible to treat successfully and using a single piece of equipment, most plant or animal biological materials such as for example berries, fruits, vegetables, condiments, or even fermented or dried animal products (fish and the like).

In other words, the invention makes it possible, by means of a single piece of equipment, to carry out, using the same installation, all the extractions both with steam and with solvents. Moreover, since this installation is connected to a vacuum source, the material can also be redistributed mechanically by stirring or by shaking, making it dissolve more rapidly.

Advantageously, in practice:

- the second, third, fourth and fifth tanks are connected, at their lower part and by valves, to a circuit designed to direct the liquid either to the lower part of the distillation column or to the lower part of the heating vessel or to the draw-off orifice;

the heating vessel incorporates a circuit, connected directly to the condenser, consisting of two outlets, connected to valves, arranged one just above and the other just below the substances to be treated;

the lower part of the heating vessel where the stirrer is placed is connected to a draw-off and recycling circuit designed, by means of a valve, to direct the solvent-solute mixture either to a storage tank (drawing off), or to a pump for recycling this liquid to the upper part of the heating vessel;

the recycling circuit incorporates a valve for directing the liquid to a sixth tank designed to recover the soluble concentrated fractions of the solvent;

the heating vessel incorporates, at the upper part, a supply orifice connected to the circuit for recycling the solvent which opens out into a means for spraying the substances with solvent, such as for example nozzles or racks.

BRIEF DESCRIPTION OF THE DRAWINGS

The manner in which the invention may be accomplished and the advantages resulting therefrom, will be understood more clearly from the exemplary embodiment below in support of the accompanying figures.

DESCRIPTION OF PREFERRED EMBODIMENT

Figure 1:
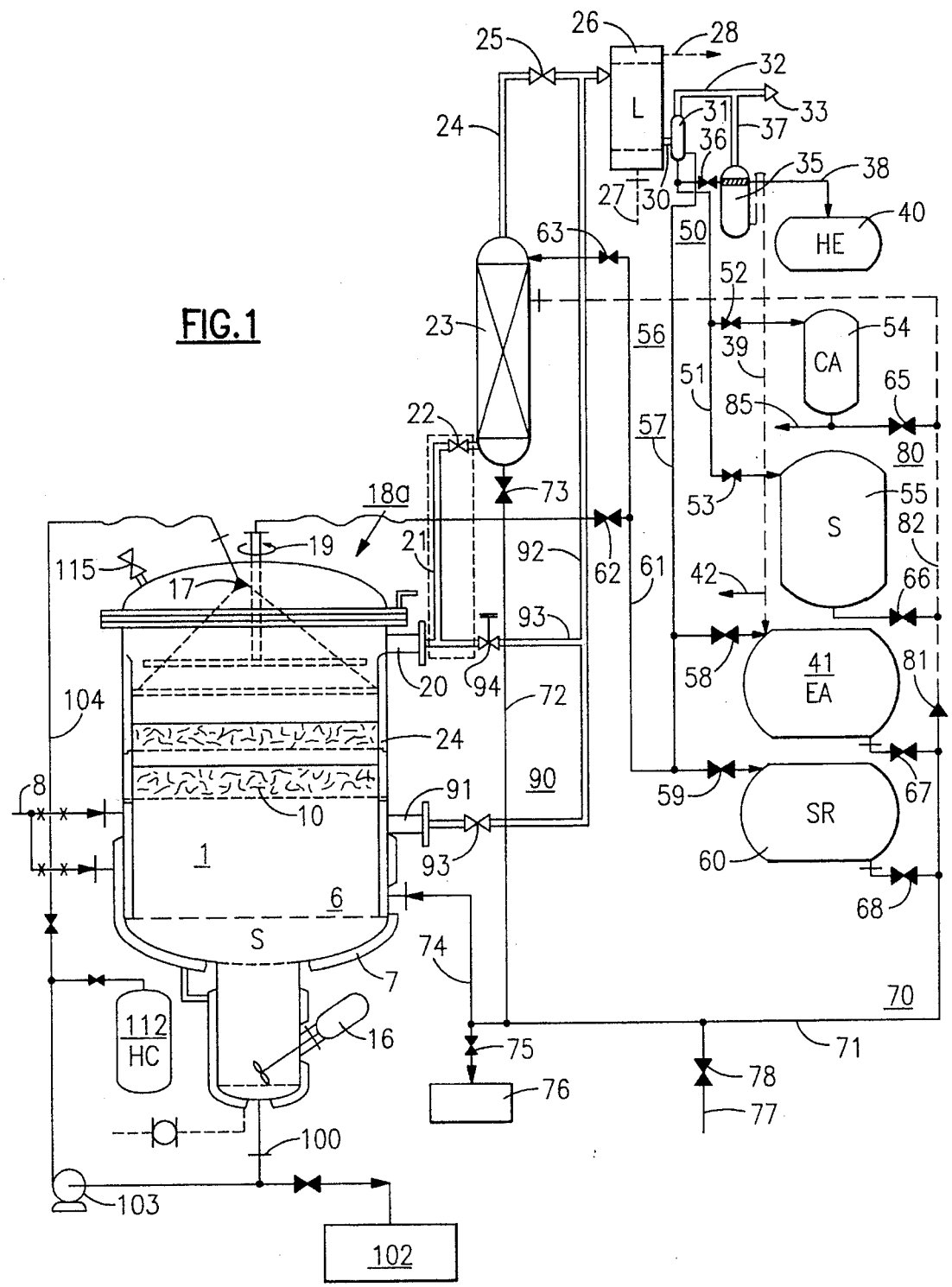
FIG. 1 is a general schematic representation of the installation conforming to the invention.
Figure 3:
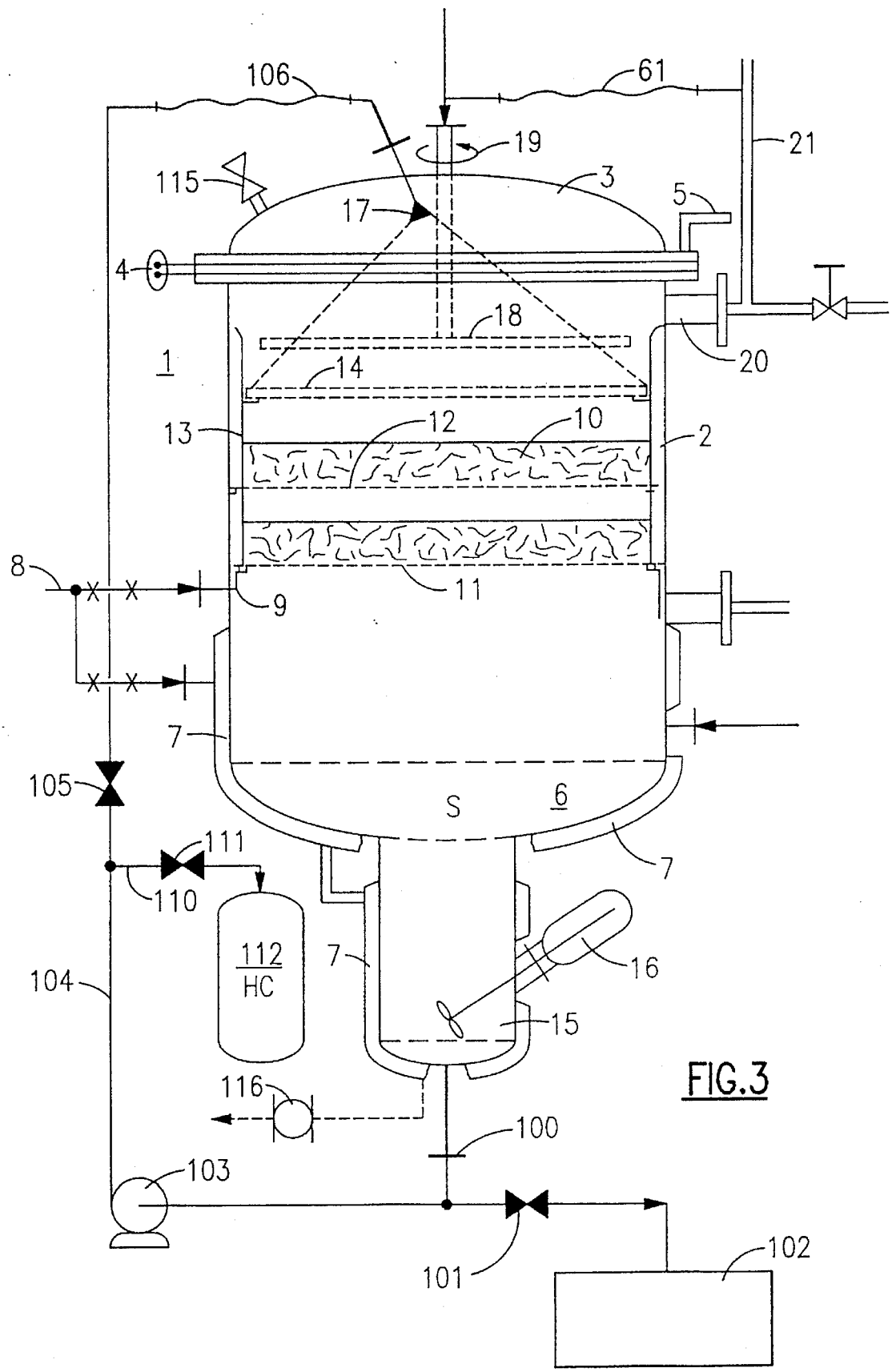

The installation conforming to the invention essentially incorporates (see FIGS. 1 and 3), a heating vessel designated by the general reference (1), which is similar to that described in the document FR-A-2,638,333, by the Applicant, mentioned in the preamble. This vessel (1) consists of a vertical stainless steel evaporation chamber (2) surmounted by a lid (3) which makes it possible, by pivoting around a hinge (4) and by means of a handle (5), to introduce the material to be treated, designated by the general reference (10). In a variant, the lid (3) may be replaced by a "manhole" linked to a side orifice for filling.

The bottom (6) of the evaporation chamber (2) is equipped with a heating ring (7). The chamber (2) and the ring (7) are connected in a known manner to a source of injected steam (8). Thus, the steam (8) makes it possible, by injection into (9), to heat the material (10) and/or to heat the ring (7) at the bottom (6). The ring (7) is used essentially to heat the bottom (6) of the chamber (2) when it is desired to evaporate the solvent (S) contained in this part of the vessel (1).

The bottom (6) of the chamber of the vessel (1) ends with an attachment (15) in which is placed in an inclined manner a stirrer (16). This high turbulence stirrer makes it possible to avoid degradations which may result when the biological substance being treated sticks to the walls of the attachment (15).

Depending on the case, the material to be treated (10) is placed either in movable (13) perforated baskets (11, 12) or on a grid. The assembly is placed above by a so-called "antipriming" grid which is also called "demister grid" (14). The reference (17) designates a nozzle for spraying with solvent (S) and the reference (18) a rotating distributing grid (19) designed to spray the material (10) with a regenerated water-alcohol mixture (Sr).

The top of the vessel chamber (2) has, just below the lid (3), an outlet (20) constituting evaporation circuit (180) connected to a pipe (21) linked to a valve (22) connected to the lower part of a distillation column (23). This column (23) may be of a known type, for example a backed, bubble or plate type. It is essentially designed to concentrate the aromatic waters (EA), to regenerate the alcoholic solvent (Sr), and to reseparate the essential oils (HE) depending upon the stage of the process by azeotropy. The top of this distillation column (23) is connected by a connecting pipe (24) and a valve (25) to the upper part of a condenser (26), for example of the "surface" type.

This condenser (26) is essentially designed to condense the light aromatic waters (EA) by vacuum and pressure effect, as well as the essential oils (HE). The references (27) and (28) designate the cold water inlet (27) and warm water outlet (28) respectively. The condenser (26) incorporates a connecting pipe (30) and a conventional bottle (31) which makes it possible to direct the liquid L derived from the condenser (26) to the characteristic circuit of the invention. This bottle (31) is connected by a piping (32) to a vacuum source (33) which makes it possible, on demand, to obtain a vacuum of 0.3 absolute bar during normal operation and 0.05 absolute bar for the evaporation/flash phase.

The liquid (L), recovered from the condenser (26), essentially consists, depending on the stages of the process, of a mixture of solvent (S), solute, essential oils (HE), aromatic waters (EA) and distillable light aromatic compounds (CA).

Figure 2:
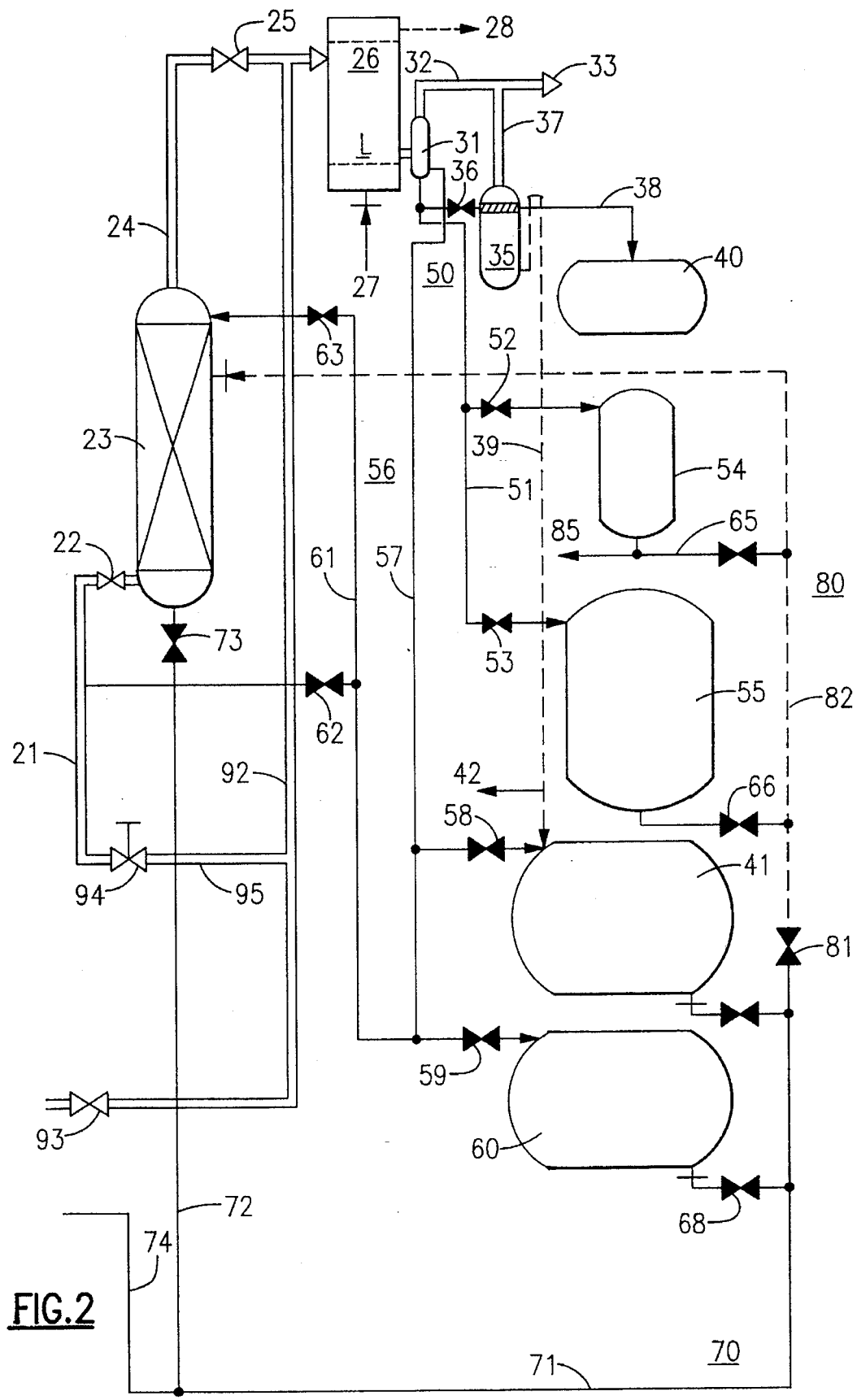
FIGS. 2 and 3 are a more detailed representation of the dual discharge circuit (FIG. 2) and of the draw-off and recycling circuit (FIG. 3), respectively.

The bottle (31) is connected at its base to a discharge circuit. According to a first characteristic of the invention (see FIG. 2), this discharge circuit comprises a decanter (35), which is connected by a valve (36) to the bottom of the bottle (31), and hence to the condenser (26). This decanter (35) is connected at the top to the vacuum source (33) by means of a piping (37). This vertical conventional decanter (35) makes it possible to decant the steam-distillable essential oils and is connected at the top (or at the bottom) to a first tank (40) for recovering the essential oils (HE) by means of a piping (38). This decanter (35) is also connected by a piping (39) to a second tank (41) for recovering the aromatic waters (EA). An outlet (42) in decanter (35) makes it possible to directly remove a portion of the aromatic waters (EA) before sending them to the tank (41).

According to another characteristic of the invention, the discharge circuit consists of a dual discharge circuit which is connected, from the bottom of the bottle (31), the first circuit (51) by a set of valves (52, 53), successively either to a third tank (54) designed to receive the light aromatic compounds (CA) such as alcohols, aldehydes, ketones and esters, or to a fourth tank (55) designed to receive the regenerated solvent (S). The second discharge circuit (56) is connected by a pipe (57) and by a set of valves (58, 59), to the second tank (41) for recovering the aromatic waters (EA) or to a fifth tank (60) for recovering the solvent to be regenerated (Sr), respectively.

According to one characteristic of the invention, this second discharge circuit (56) is connected by a reflux pipe (61) and by valves (62, 63) either to the upper part (19) of the chamber (2) of the heating vessel (1), or to the upper part of the distillation column (23).

According to another characteristic of the invention, the second (41), third (54), fourth (55) and fifth (60) tanks are connected at their lower part by multi-way valves (65, 66, 67, 68) to a multi-way circuit designated by the reference (70) which makes it possible, by a pipe (71), to directly direct the liquid (L) recovered from the condenser (26)

either to the lower part of the distillation column (23) by means of the pipe (72) and the valve (73), or by a pipe (74) to the lower part (6) of the heating vessel (1), or by the valve (75) to the draw-off orifice (76).

The reference (77) and the valve (78) designate a supply of fresh solvent (S) into the pipe (71).

Another circuit (see FIG. 2), designated by the reference (80) makes it possible, by a valve (81) and a pipe (82), to direct the aromatic waters (EA), the nondecantable water-soluble aromatic compounds (CA) or the solvent to be regenerated (Sr) directly to the top of the distillation column (23) so as to further fractionate it continuously. An outlet (85) makes it possible, if it is desired, to extract directly from the third tank (54) the light aromatic compounds (CA) which are marketable.

According to another characteristic of the invention, the chamber (2) of the heating vessel (1) incorporates a heating vessel circuit circuit designated by the general reference (90), equipped with an outlet (91) placed in the chamber (2) just below the substance to be treated (10), which outlet is connected by a piping (92) to a valve (93), and from there directly to the condenser (26). The outlet (20) placed just above the material (10) to be treated is connected by a connection (93) and a valve (94) to the principal piping (92) which is connected to the condenser (26). This circuit (92) makes it possible, by recondensing only in (26), to return by the reflux circuit (61) either into the distillation column (23) in order to enrich the solvent (S), or directly by the valve (62) into the heating vessel (1) by spraying with solvent (S), using the rack (18), the material (10) to be treated, or using any other distributing device, such as nozzles or static distributors. The exhaustion of the solute from the material (10) is thus facilitated and enhanced.

According to another characteristic of the invention (see FIG. 3), the lower part (15) of the heating vessel (1), where the stirrer (16) is placed, is connected at the bottom to a draw-off-recycling circuit. A valve (101) makes it possible to direct, on demand, the solvent/solute mixture either to a storage tank (102) where this mixture is drawn off, or by a pump (103) into the pipe (104) which, by the valve (105) and the pipe (106), is connected to the spray nozzle (17). The centrifugal pump (103) thus makes it possible to continuously recycle the solvent/solute mixtures. A shunt piping (110), linked to a valve (111), makes it possible to send the soluble concentrated compounds (HC) to a sixth tank (112).

The reference (115) designates a vent placed in the lid (3) of the vessel (1), and the reference (116) designates a drain cock or a pump designed to evaporate the heating steam condensates.

The installation conforming to the invention operates in the following manner.

A pink bayberry (10), which is particularly sought after for its fresh aroma, is placed in perforated baskets (11, 12). This material (10) is distributed in baskets or on grids using a rake. The lid (3) is closed, then the vessel is degassed either by means of the vacuum (33), or by opening the vent (115) for degassing at atmospheric pressure.

Heat is then applied by means of injected steam (8) so as to bring the material (10) to a temperature of between 80° and 100° C. The duration of this heating (of the order of a few minutes or even a few seconds) depends essentially on the nature and the quality of the material (10) to be treated.

The valve (94) is then abruptly opened so as to place the chamber (2) directly in communication with the condenser (26) which is previously placed under a high vacuum (of 0.01 to 0.05 absolute bar). The material (10) thus spontaneously evaporates in a few seconds. This is the so called "flash" effect. Five to ten per cent of the material is thus recovered in the tank (41) for the waters rich in light aromatic compounds (EA).

Once the "flash" has finished, the decantable essential oils are extracted either by treating with steam (8), or at atmospheric pressure, or by means of a moderate vacuum source (33) (0.3 absolute bar), and the decantable essential oil (HE) is recovered in the first tank (40) and the aromatic waters (EA) in the second tank (41). Due to the stirring caused by this "flash", the material (10) is also redistributed in the baskets (11, 12), which will then facilitate the subsequent diffusion of the solvents coming from the nozzle (17).

The aromatic waters which cannot be vaporized are removed in (42).

At this point, all the volatile or distillable compounds have therefore been extracted from the material (10).

There is then introduced into the chamber (2), by means of the pipe (77), more precisely at the bottom of the chamber (6), a solvent (S), more exactly a fresh water-alcohol mixture or even a mixture regenerated in (55). The steam (8) is then released into the jacket (7) in order to bring the solvent S placed at the bottom (6) of the chamber (2) to a temperature of between 50° and 60°. This solvent (S) is diffused through the nozzle (17) by means of the centrifugal pump (103) during the preceding flash procedure, by means of the steam (8). This diffusion phase generally lasts between fifteen and sixty minutes; it may be prolonged if necessary.

The solvent/solute mixture is then released into the circuit (92) in order to recover the solvent in the condenser (26). A liquid L, rich in solvent/solute, is obtained which is recycled by refluxing (62) in (19) to the top of the vessel (1). Periodically, this solvent/solute mixture is drawn off in (102) in order to be stored. This mixture contains 20 to 80% of solvent (S). To recover this solvent (S), solvent is then removed from the material (10) by injection of steam (8). The valve (94) is opened in order to convey the solvent-charged steam to the condenser (26). The liquid L is conveyed to the fifth tank (60) by the discharge circuit (57).

The material (10) then being completely exhausted, is withdrawn so as to be discharged as waste.

The operation can be repeated several times according to a preestablished procedure.

The opening of the various valves can be carried out either manually or automatically.

The various separations are periodically carried out.

To concentrate the aromatic waters (EA) contained in the second tank (41), the valve (67) is opened in order to send the liquid into the heating vessel (1). The valve (22) is opened in order to put the distillation column (23) into operation, then the valve (25) is opened in order to put the condenser (26) into operation. The light aromatic concentrates (CA) are then recovered in the third tank (54) and refluxed using (61) at the top of the distillation column (23).

A marketable compound rich in aromatic concentrates (CA) is therefore obtained in the tank (54), which is drawn off in (85) or which is processed by sending it into the circuit (70) so as to bring it into the heating vessel (1).

The aromatic waters (EA) contained in the tank (41) can thus be easily redistilled continuously by supplying them, by the circuit (80), to the middle of the distillation column (23). When it is desired to recover the solutes which are momentarily stored in (102), they are reintroduced into the bottom (6) of the chamber (2). By heating the jacket (7), the solvent (S) is evaporated while ensuring that it is vigorously stirred, preferably under vacuum. The solvent then returns to the condenser (26) to be stored in the fifth tank (60). Once all the solvents have been removed, the soluble compounds are recovered in the fifth tank (60).

When it is desired to regenerate the solvent (S), the valve (68) simply has to be opened in order to convey it by the piping (70) to the bottom (6) of the chamber (2). The distillation column (23) is then brought back into operation and the regenerated solvent is recovered, by the first discharge circuit (51) and the valve (53), in the fourth tank (55). The solvent thus regenerated (S) can, on demand, be reintroduced either into the distillation column (23) or into the circuit (70), by the valve (66).

The installation according to the invention makes it possible, using a single piece of equipment, to extract all the compounds vaporized from a biological material and to concentrate all these compounds. Moreover, using a vacuum source, the material is prepared for the subsequent diffusion stage. Since in addition it is possible to carry out the procedure under a controlled vacuum, the quality of the compounds is greatly improved.

In this way, this installation can be successfully used for the treatment of all plant materials having compounds which can be extracted with steam or with solvent, such as especially the plant materials: plants, fruits, berries and the like.

I claim:

1. An apparatus for extracting, concentrating, and separating biochemical compounds from plant or animal biological substances, comprising:

a heating vessel, for receiving the substances to be treated;

a steam supply connected to a lower part of said heating vessel;

a stirrer at the lower part of said heating vessel wherein biochemical compounds are extracted from plant or animal biological substances that are heated and stirred in said heating vessel;

an evaporation means to which an upper part of said vessel is connected;

a distillation column;

a first valve connecting said evaporation means to a bottom of said distillation column;

a vacuum source;

a condenser means connected to said vacuum source;

a second valve connecting said condenser means to a top of the distillation column;

a decanter, said vacuum source being connected to a top of said decanter;

a third valve connecting the decanter to said condenser means wherein said extracted biochemical substances are concentrated by passing through said evaporation means, said distillation column and recovered in said condenser means;

a first tank connected to said decanter wherein essential oils (HE) are separated by passing from said decanter into said first tank;

a second tank connected to said decanter wherein aromatic water (EA) is separated by passing from said decanter into said second tank; and a dual discharge means, having a first and second means, said first means having:

a third tank, connected by a fourth valve to said first means, wherein light aromatic compounds (CA), are separated by passing from said decanter to said third tank and a fourth tank, said fourth tank connected by a fifth valve to said first means, wherein regenerated solvent (S), is separated by passing from said decanter to said fourth tank, said second means having a fifth tank designed to receive solvent to be regenerated (Sr), a reflux means, said reflux means being connected by an eighth valve and a ninth valve to a member of the group consisting of (1) the upper part of the heating vessel and (2) an upper part of the distillation column, said second means being connected by a sixth valve and a seventh valve to a member of a first group of members consisting of:

(1) the second tank wherein aromatic waters (EA), are separated by passing from said decanter to said second tank, (2) the fifth tank, and (3) said reflux means.

2. The apparatus according to claim 1 wherein a lower part of the second tank, a lower part of the third tank, a lower part of the fourth tank, and a lower part of the fifth tank, are connected to a multi-way circuit by multi-way circuit valves, said multi-way circuit being designed to direct liquid to a member of a second group of members consisting of: (1) the lower part of the heating vessel, (2) the top of the distillation column, and (3) a draw-off orifice wherein liquid recovered from the condenser may be directed to one of said second group of members.

3. The apparatus according to claim 1 wherein said heating vessel incorporates a heating vessel means connected directly to the condenser means, and said heating vessel means consists of a first outlet connected to a tenth valve, and a second outlet connected to an eleventh valve, wherein said eleventh valve is situated above said twelfth valve, both the eleventh and twelfth valves are situated below the substances to be treated.

4. The apparatus according to claim 1 wherein said stirrer is located in the lower part of the heating vessel, and is connected to a draw-off and recycling means, said draw-off and recycling means being adapted, by means of a thirteenth valve, to direct a solvent-solute mixture to one of a group consisting of: a storage tank for drawing off said solvent-solute mixture, and a pump for recycling said solvent-solute mixture to the upper part of the heating vessel.

5. The apparatus according to claim 4 wherein said recycling means incorporates a fourteenth valve for directing the solvent-solute mixture to a sixth tank, said sixth tank being designed to recover soluble concentrated fractions (HC) of the solvent.

6. The apparatus according to claim 1 wherein said upper part of said heating vessel has a supply orifice connected to a recycling means, said supply orifice being connected to a means for spraying the substances to be treated with the solvent.

7. The apparatus according to claim 6 wherein said spraying means is a member of a third group of members consisting of: nozzles, racks, and a static distributor.

* * * * *